United States Patent
Xu et al.

(10) Patent No.: US 10,380,198 B2
(45) Date of Patent: Aug. 13, 2019

(54) MULTITASKING RESOURCE ALLOCATION SYSTEM AND METHOD ON INTERNET OF THINGS SERVICE PLATFORM

(71) Applicant: Graduate School at Shenzhen, Tsinghua University, Shenzhen, Guangdong (CN)

(72) Inventors: Ke Xu, Beijing (CN); Yuchao Zhang, Beijing (CN); Xin Liu, Beijing (CN); Yaxiao Liu, Beijing (CN)

(73) Assignee: GRADUATE SCHOOL AT SHENZHEN, TSINGHUA UNIVERSITY, Shenzhen, Guangdong (CN)

(*) Notice: Subject to any disclaimer, the term of this patent is extended or adjusted under 35 U.S.C. 154(b) by 924 days.

(21) Appl. No.: 14/572,878

(22) Filed: Dec. 17, 2014

(65) Prior Publication Data

US 2015/0169768 A1    Jun. 18, 2015

(30) Foreign Application Priority Data

Dec. 18, 2013  (CN) .......................... 2013 1 0698991

(51) Int. Cl.
| | | |
|---|---|---|
| *G06F 16/00* | (2019.01) | |
| *G06F 7/00* | (2006.01) | |
| *G06F 16/951* | (2019.01) | |
| *H04L 29/08* | (2006.01) | |
| *H04W 4/70* | (2018.01) | |
| *G06F 9/50* | (2006.01) | |

(52) U.S. Cl.
CPC .......... *G06F 16/951* (2019.01); *G06F 9/5072* (2013.01); *H04L 67/02* (2013.01); *H04W 4/70* (2018.02)

(58) Field of Classification Search
CPC ......... G06F 17/30864; G06F 17/30067; G06F 17/30545; G06F 17/30595; G06Q 30/02
USPC ........................................................ 707/770
See application file for complete search history.

(56) References Cited

U.S. PATENT DOCUMENTS

| | | | | |
|---|---|---|---|---|
| 2008/0247313 A1* | 10/2008 | Nath | ........................ | H04Q 9/00 370/231 |
| 2009/0028186 A1* | 1/2009 | Schmidt | .............. | H04L 12/2838 370/468 |
| 2009/0224941 A1* | 9/2009 | Kansal | ..................... | H04Q 9/00 340/870.06 |

(Continued)

*Primary Examiner* — Usmaan Saeed
*Assistant Examiner* — Raquel Perez-Arroyo
(74) *Attorney, Agent, or Firm* — Houtteman Law LLC

(57) ABSTRACT

The present disclosure relates to a method including: receiving resource requests from clients and converting the resource requests into search requests in sequence; searching a resource list of sensor nodes of cloud according to search conditions of the search request and obtaining a resource ID of the sensor node that meets the search conditions; searching a data list of the sensor node and reading a working frequency of the sensor node in the resource list; comparing the working frequency with a desired frequency in the search conditions to determine if buffered data in the data list can meet requirements; feeding back the buffered data to the clients if the buffered data meets the requirements; and controlling the sensor nodes to collect data according to the search conditions and priorities of the sensor nodes and sending the collected data to the clients if the buffered data cannot meet the requirements.

16 Claims, 4 Drawing Sheets

(56) References Cited

U.S. PATENT DOCUMENTS

2011/0302351 A1* 12/2011 Aybay .................. H04L 12/403
                                                    711/1
2015/0106616 A1*  4/2015 Nix ........................ H04W 4/70
                                                    713/156

* cited by examiner

MULTITASKING RESOURCE ALLOCATION SYSTEM AND METHOD ON INTERNET OF THINGS SERVICE PLATFORM

CROSS-REFERENCE TO RELATED APPLICATION

This application claims priority to and benefits of Chinese Patent Application Serial No. 201310698991.0, filed with the State Intellectual Property Office of P. R. China on Dec. 18, 2013, the entire contents of which are incorporated herein by reference.

FIELD

The present disclosure relates to technologies of Internet of Things (IoT), and more particularly to a multitasking resource allocation system and method of IoT.

BACKGROUND

IoT is the interconnection of uniquely identifiable embedded computing devices within the existing Internet infrastructure. Typically, IoT is expected to offer advanced connectivity of devices, systems, and services that goes beyond machine-to-machine communications (M2M) and covers a variety of protocols, domains, and applications. The interconnection of these embedded devices (including smart objects), is expected to introduce automation to nearly all fields, while also enabling advanced applications like a Smart Grid.

Things, in the IoT, can refer to a wide variety of devices such as heart monitoring implants, biochip transponders on farm animals, automobiles with built-in sensors, or field operation devices that assist fire-fighters in search and rescue. Current market examples include smart thermostat systems and washer/dryers that utilize Wi-Fi for remote monitoring.

However, current supporting system for the IoT may allocate resource unbalancedly and concurrent requests from different clients may conflict with each other, resulting in bad user experience.

SUMMARY

According to an aspect of the present disclosure, a multitasking resource allocation method of Internet of Things (IoT), includes the following steps:
  receiving resource requests from clients and converting the resource requests into search requests in sequence;
  searching a resource list of sensor nodes of cloud according to search conditions in the search request and obtaining resource IDs of the sensor nodes that meet the search conditions;
  searching a data list of the sensor nodes and reading a working frequency of the sensor nodes in the resource list;
  comparing the working frequency with a desired frequency in the search conditions to determine if buffered data in the data list can meet requirements;
  feeding back the buffered data to the clients if the buffered data meets the requirements; and
  controlling the sensor nodes to collect data according to the search conditions and priorities of the sensor nodes, sending the collected data to the clients if the buffered data cannot meet the requirements.

In one embodiment, the method further comprises the following step after the step of searching the resource list:
  adding a new sensor node if the sensor nodes in the cloud do not meet the search conditions.

In one embodiment, the step of controlling comprises the following sub-steps:
  sorting the sensor nodes according to the difference between the working frequency and the highest frequency;
  waking up the sensor nodes in sequence according to the priorities thereof and sending the search conditions to each waked sensor node; and
  controlling the waked sensor nodes to sample data according to the difference between the desired frequency in the search conditions and the working frequency in the data list.

In one embodiment, the step of controlling also comprises the following sup-step before the sub-step of waking up,
  changing the state of sensor nodes with the resource ID into busy.

In one embodiment, the step of controlling also comprises the following sub-step after the sub-step of controlling:
  changing the state of sensor nodes with the resource ID into sleep.

According to an aspect of the present disclosure, a multitasking resource allocation system of IoT, includes:
  a receiving module for receiving resource requests from clients and converting the resource requests into search requests in sequence;
  a resource searching module for searching a resource list of sensor nodes according to search conditions in the search request, and obtaining a resource ID of the sensor node that meets the search conditions;
  a data searching module for searching a data list of the sensor node and reading a working frequency of the sensor node in the resource list;
  a determining module for comparing the working frequency with a desired frequency in the search conditions to determine if buffered data in the data list can meet requirements;
  an obtaining module feeding back the buffered data to the clients if the buffered data meets the requirements; and
  a controlling module for controlling the sensor nodes to collect data according to the search conditions and priorities of the sensor nodes, and sending the collected data to the clients if the buffered data cannot meet the requirements.

In one embodiment, the system further comprises a node adding module for adding a new sensor node if the sensor nodes of the cloud do not meet the search conditions.

In one embodiment, the controlling module comprises:
  a sorting unit for sorting the sensor nodes according to the difference between the working frequency and the highest frequency;
  a waking unit for waking up the sensor nodes in sequence according to the priorities thereof and sending the search conditions to each waked sensor node;
  a controlling unit for controlling the waked sensor nodes to sample data according to the difference between the desired frequency in the search conditions and the working frequency in the data list; and
  an obtaining unit for obtaining the data and sending the data to the client.

In one embodiment, the system also comprises an updating module for changing the state of sensor node with the resource ID into busy before the sensor node is waked up.

In one embodiment, the system also comprises an updating module for changing the state of sensor node with the resource ID into sleep after the data is sent.

The multitasking resource allocation method on IoT service platform searches the resource list and the data list of the sensor nodes in the cloud, sorting priorities of the resource IDs, and wakes up the sensor nodes with the resource IDs according to the priorities, and controls the sensor node to collect the data according to the search conditions, and coordinates the sensor nodes, and allocates the sensor nodes. As such, efficiencies of the sensor nodes are increased and working loads of the sensor nodes are balanced.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
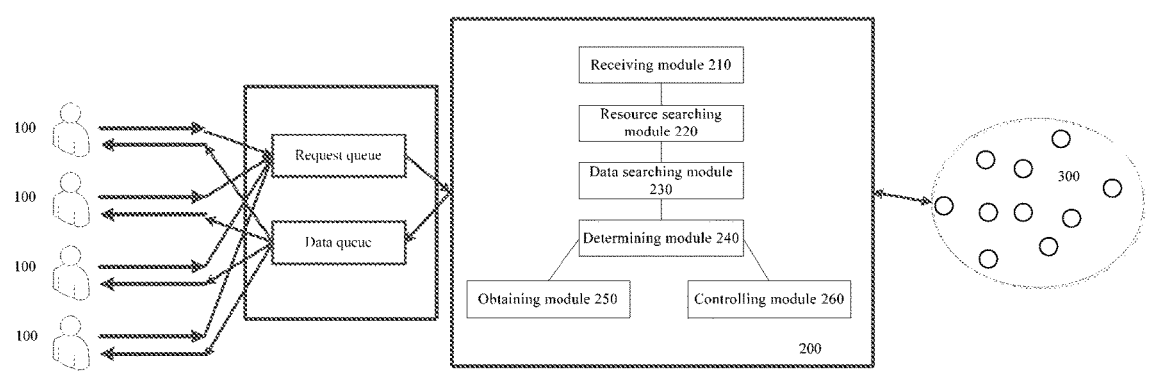
FIG. 1 is a functional block diagram of a multitasking resource allocation system of IoT according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In addition, terms such as "first" and "second" are used herein for purposes of description and are not intended to indicate or imply relative importance or significance or imply a number of technical features indicated. Therefore, a "first" or "second" feature may explicitly or implicitly comprise one or more features. Further, in the description, unless indicated otherwise, "a plurality of" refers to two or more.

Figure 2:
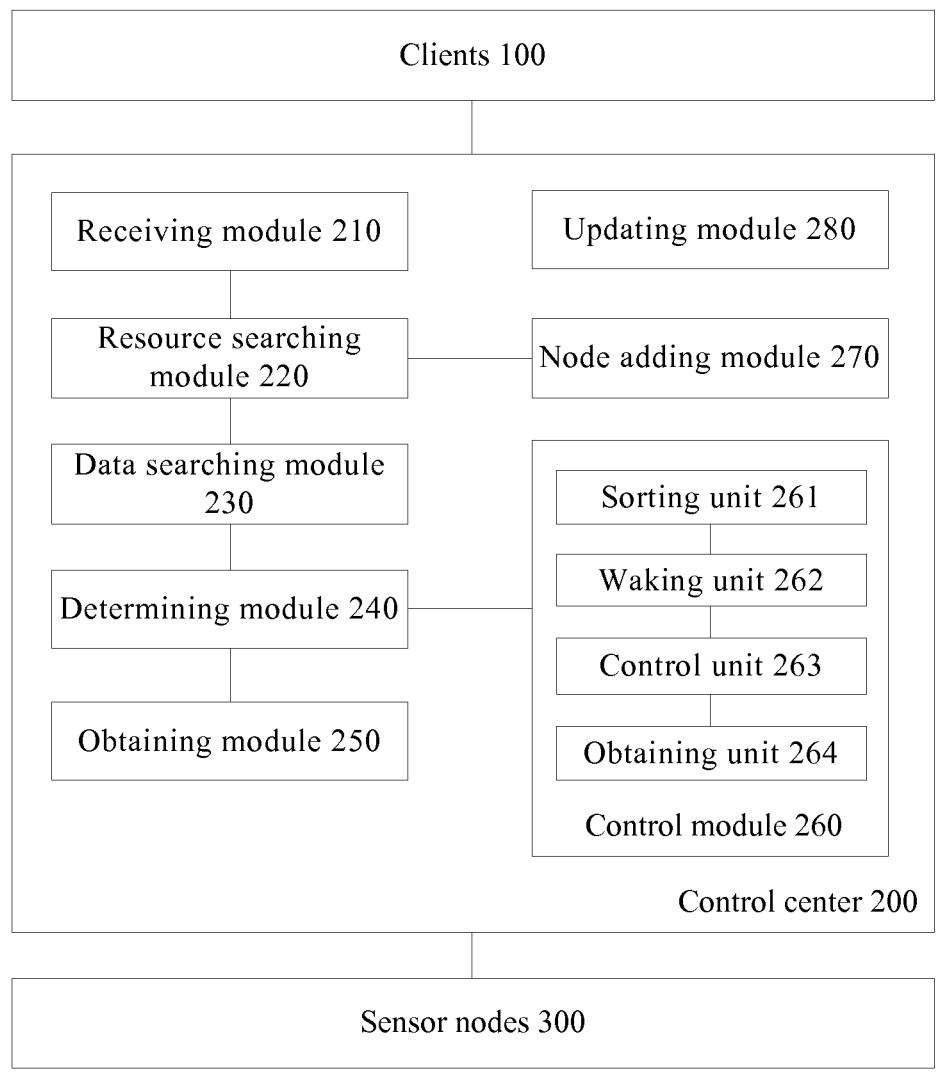
FIG. 2 is another functional block diagram of a multitasking resource allocation system of IoT according to an embodiment of the present disclosure.

FIGS. 1-2 show a multitasking resource allocation system of IoT according to an embodiment of the present disclosure.

As shown in FIG. 1, the system includes clients 100, control center 200, and sensor nodes 300. The control center 200 includes a receiving module 210, a resource searching module 220, a data searching module 230, a determining module 230, an obtaining module 250, and a controlling module 260.

As shown in FIG. 2, the control center 200 further includes a node adding module 270 and a updating module 280.

The control module 260 includes a sorting unit 261, a waking unit 262, a controlling unit 263, and an obtaining module 264.

Figure 3:
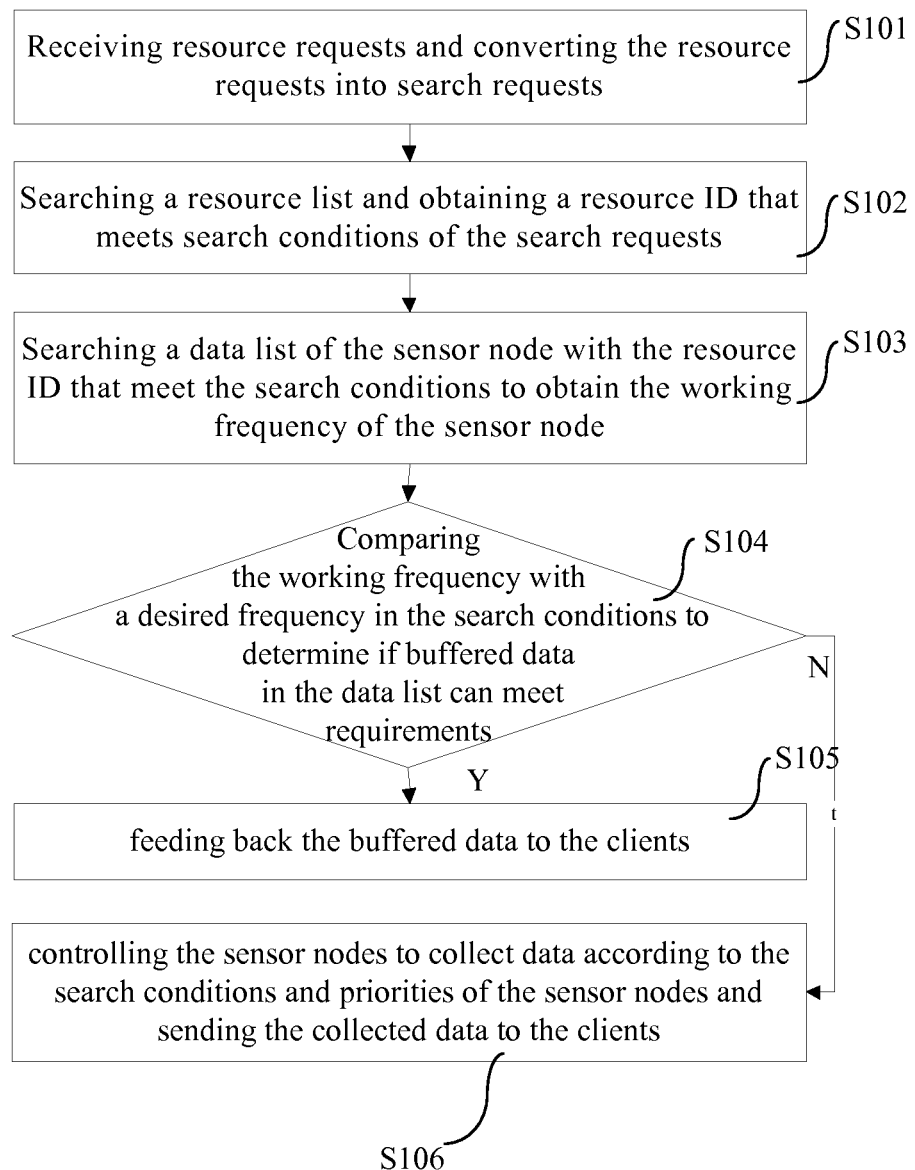
FIG. 3 is a flow chart of a multitasking resource allocation method of IoT according to an embodiment of the present disclosure.

FIG. 3 is a flowchart of a multitasking resource allocation method of IoT, according to an embodiment of the present disclosure.

The method includes the following steps S101-S106. In this embodiment, the method can be performed by the system.

In step S101, resource requests from the clients 100 are received and converted into search requests in sequence.

In this embodiment, sensors of the IoT can be various types, such as temperature sensors and moisture sensors. Accordingly, the resource requests can be various types too. As such, the resource requests need to be converted into the search requests as a universal standard by the control center 200 to collectively control a resource list and a data list of the cloud. The control center 200 is used for collectively controlling allocation of the resources, and can convert the resource requests in a request queue into the universal standard, that is, the search requests. In detail, the control center 200 receives the resource request from the clients 100 by users and queues the resource requests in sequence, and converts the resource requests into the search requests according to first in first out (FIFO) rule. If more than one user sends the resource requests to the control center 200 at the same time, the resource requests may be in conflict with each other. In this case, each of the resource requests may be held for a random time delay and then is sent again to avoid the conflict. If they still have conflicts, the resource requests can be held for another random time delay.

In this embodiment, the step S101 can be performed by the receiving module 201.

S102, the resource list of the sensor nodes 300 of the cloud is searched according to search conditions in the search request, and a resource ID of the sensor node 300 that meets the search conditions is obtained.

In this embodiment, the cloud includes the resource list of the sensor nodes 300. The resource list is used for recording information of all the sensor nodes 300 of a network. In the initialization of the sensor node 300, the information of the sensor node 300 is written into the resource list. The information of the sensor node 300 includes the resource ID, a location of the sensor node 300, a state of the sensor node 300, a type of the sensor node 300, and the highest frequency of the sensor node 300. The type of the sensor node 300 can be the temperature sensor and the moisture sensor. The state of the sensor node 300 can be sleep, busy, or disabled. After the initialization of the sensor node 300, the sensor node 300 enters the sleep state. The highest frequency of the sensor node 300 is the biggest number that the sensor node 300 can sample data.

In editing the resource list of the sensor nodes 300, the sensor node 300 can be added, deleted, changed, or searched. When adding a new sensor node 300, the information of the new sensor node 300 needs to be added to the resource list. When the existing sensor node 300 is damaged or removed, the information of the damaged or removed sensor node 300 should be deleted, accordingly. When the type of the sensor node 300 is changed, the resource list need to be changed accordingly. In addition, if the search request is received, the resource list is searched to find the sensor node 300 that meet the search conditions in the search request.

Table 1 is an example of the resource list of the sensor node 300 of the cloud.

TABLE 1

| Resource ID | Location | State | Type | Highest frequency |
|---|---|---|---|---|
| 1 | 4-104, fit building, Tsinghua University | disabled | Temperature | 1 time/ 1 minute |
| 2 | 4-104, fit building, Tsinghua University | busy | Temperature | 1 time/ 5 minutes |
| 3 | 4-104, fit building, Tsinghua University | sleep | Moisture | 1 time/ 5 minutes |
| 4 | 4-104, fit building, Tsinghua University | sleep | Temperature | 1 time/ 5 minutes |

As shown in Table 1, four sensor nodes 300 are located at 4-104, fit building, Tsinghua University. The sensor node 300 with the resource ID 1 is disabled, and is the temperature sensor with the highest frequency of about 1 time per minute. The sensor node 300 with the resource ID 2 is busy, and is the temperature sensor with the highest frequency of about 1 time per 5 minutes. The sensor node 300 with the resource ID 3 is sleep, and is the moisture sensor with the highest frequency 1 time per 5 minutes. The sensor node 300 with the resource ID 4 is sleep, and is the temperature sensor with the highest frequency of about 1 time per 5 minutes.

For example, if the user want to know the temperature at 4-104, fit building, Tsinghua University, every 10 minutes, it can be found the sensor node 300 of resource ID 4 can meet the search conditions by searching the resource list. In detail, a sample frequency 1 time per 10 minutes is within a capability of the sensor node 300 with the resource ID 4.

In this embodiment, the control center 200 can add a new sensor node 300 according to user's need to meet the search conditions. For example, if the user wants to know the temperature at 4-104, fit building, Tsinghua University, however, the sensor nodes 300 in the resource list do not meet the search conditions, for example, not the right location, disabled, wrong type, or exceeding the highest frequency of the sensor node 300. In this case, the new sensor node 300 that meets the search conditions is required to be added.

In this embodiment, the step S102 can be performed by the resource searching module 220. However, the new sensor node 300 can be added by the node adding module 270.

In step S103, the data list is searched and the working frequency of the sensor node 300 in the resource list is read.

In this embodiment, the cloud also includes the data list of each sensor node 300. The data list stores the data recorded by the sensor node 300 in a specific time period. For example, as shown in Table 2, the sensor node 300 with the resource ID 1 samples and records the data at the working frequency of about 1 time per minute and the data is stored in the data list of the sensor node 300.

As such, after the sensor node 300 is found to be met with the search conditions, the data list of the sensor node 300 is searched to find out the working frequency of the sensor node 300. However, if the sensor data does not collect any data, the data list of the sensor node 300 is blanked. For example, the sensor node 300 with the resource ID 4 has nothing in the data list. Table 2 shows examples of the data list, wherein the data list of the sensor node 300 with resource ID 4 is blanked.

TABLE 2

| Resource ID | Time period | working frequency | Data list |
|---|---|---|---|
| 1 | 2013-6-3021:00-21:30 | 1 time/ minute | 28 28 28 29 28 . . . |
| 2 | 2013-11-1 14:00-15:00 | 1 time 5 minutes | 22 25 24 25 23 . . . |
| 3 | 2013-10-25 8:00-10:00 | 1 time/ 5 minutes | 40% 42% 41% 50% . . . |
| 4 | | | |

In this embodiment, the step S103 can be performed by the data searching module 230.

In step S104, the working frequency is compared with the desired frequency in the search conditions, to determine if buffered data in the data list can meet requirements.

In this embodiment, the step S104 can be performed by the determining module 240.

In step S105, if the buffered data meets the requirements, the buffered data in the data list is fed back to the clients 100.

In this embodiment, if the sensor node 300 that meets the search conditions and has sufficient data in the data list, that is, the collected data can satisfy the user's need, then the sensor node 300 is not required to be waked up for further data sample and collection. In this case, it only requires that the buffered data in the data list can be sent to the clients 100.

In this embodiment, the step S105 can be performed by the obtaining module 250.

In step S106, if the buffered data cannot meet the requirements, the sensor nodes 300 are controlled to collect data according to the search conditions and priorities of the sensor nodes 300, and the collected data is sent to the clients 100.

In this embodiment, the step S106 can be performed by the controlling module 260.

Figure 4:
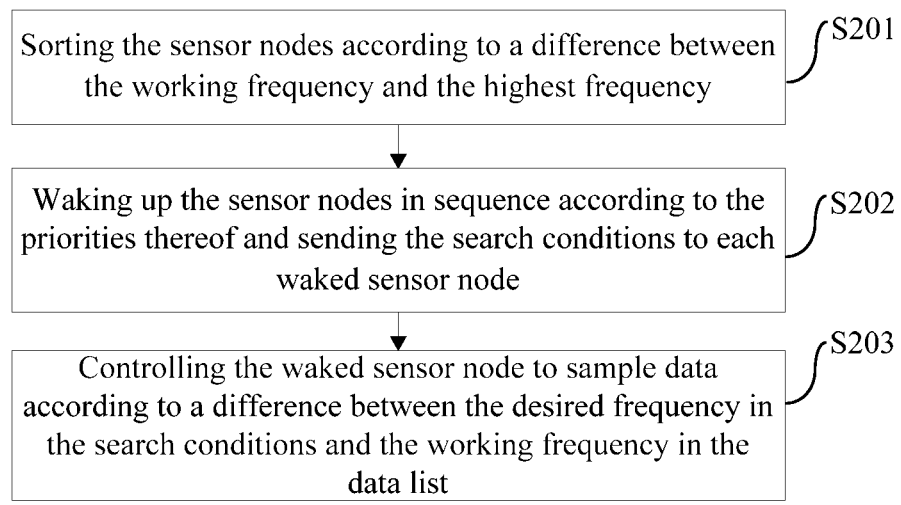
FIG. 4 is a flow chart of a step of a multitasking resource allocation method of IoT according to an embodiment of the present disclosure.

FIG. 4 shows a flow chart of a method for controlling the sensor nodes 300 to collect data according to the search conditions and the priorities of the sensor nodes 300. The method includes the following steps S201-S203.

In step S201, the sensor nodes 300 are sorted according to a difference between the working frequency and the highest frequency. The higher the difference is, the higher the priority of the sensor node 300 is.

In this embodiment, the step S201 can be performed by the sorting unit 261.

In step S202, the sensor nodes 300 are waked up in sequence according to the priorities thereof and the search conditions are sent to each waked sensor node 300.

In this embodiment, the step S202 can be performed by the waking unit 262.

In step S203, the waked sensor node 300 is controlled to sample data according to a difference between the desired frequency in the search conditions and the working frequency in the data list.

In this embodiment, the step S203 can be performed by the controlling unit 263.

In step S204, in this embodiment, according to the priorities of the resource ID, the sensor node 300 with the bigger difference between the desired frequency of the search conditions and the working frequency of the data list is firstly waked up. In detail, the sensor nodes 300 are waked in this order from the bigger to the smaller difference and the search conditions are sent to the sensor node 300 that is waked up.

In this embodiment, before the sensor node 300 with the resource ID is waked up, the state of sensor node 300 with the resource ID is changed into busy. This can be done by the updating module 280.

In this embodiment, the control center 200 controls the waked sensor node 300 to collect the data according to the search conditions. As an example, if the user wants to sample temperature at 4-104, fitting building, Tsinghua University, every 5 minutes between the time period from 21:00 to 21:30 Jun. 30, 2013, that is, six temperature values. If based upon the data list it is supposed to already have three temperature values that are sampled at every 10 minutes between the time period from 21:00 to 21:30 Jun. 30, 2013. Then, the sensor node 300 is waked up to sample the other three temperature values.

If the resource requests are different but the search conditions are substantially identical, then the data can be reused to save resource and elongate service life of the sensor nodes 300. For example, if the user wants to collect temperature at 4-104, fitting building, Tsinghua University, every 5 minutes between the time period from 21:00 to 21:30 Jun. 30, 2013, that is, six temperature values. But the data list includes has buffered data that is six temperature values at 4-104, fitting building, Tsinghua University, every 5 minutes between the time period from 12:00 to 12:30 Jun. 30, 2013. As the time period is not met the search conditions, the sensor node 300 is waked up to sample data.

That is, in this embodiment, if the sensor node 300 has sampled data before, but the time period is different from the time period set forth in the search conditions, the sensor node 300 needs to be waked up to collect data to satisfy the user's need.

In this embodiment, the control center 200 collects the data the sensor node 300 sampled and adds the data into the data list, to enable the clients 100 can get feedback data resource from the data list.

In this embodiment, after the sensor node 300 collect the data according to the search conditions, the state the sensor nodes 300 with the resource ID is changed into sleep.

The multitasking resource allocation system and method of IoT searches the resource list and the data list of the sensor node 300 of the cloud, sorting priorities of the resource IDs, and wakes up the sensor nodes 300 with the resource IDs according to the priorities, and controls the sensor node 300 to collect the data according to the search conditions, and coordinates the sensor nodes 300 of the cloud, and allocates the sensor nodes 300 of the cloud. As such, efficiencies of the sensor nodes 300 are increased and working loads of the sensor nodes 300 are balanced.

In an example of the multitasking resource allocation method, first, the control center 200 receives the resource request form the clients 100 and the resource requests are converted into the search requests in sequence. Then, the resource list of the sensor nodes 300 of the cloud is searched to determine if any sensor node 300 is satisfied to the search conditions. If yes, the data list of the sensor node 300 is searched to obtain the working frequency of the sensor node 300. The working frequency is compared with the desired frequency in the search condition to determine if the buffered data in the data list can meet the search conditions. If yes, the buffered data is read and fed back to the clients 100. If the buffered data cannot meet the search conditions, the control center 200 controls the sensor nodes 300 to collect data according to the priorities of their resource IDs and send the collected data to the clients 100.

The multitasking resource allocation method of IoT searches the resource list and the data list of the sensor node 300 of the cloud, sorting priorities of the resource IDs, and wakes up the sensor nodes 300 with the resource IDs according to the priorities, and controls the sensor node 300 to collect the data according to the search conditions, and coordinates the sensor nodes 300 of the cloud, and allocates the sensor nodes 300 of the cloud. As such, efficiencies of the sensor nodes 300 are increased and working loads of the sensor nodes 300 are balanced.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A computer-implemented method for multitasking resource allocation of Internet of Things (IoT), comprising the following steps:

receiving resource requests from clients and converting the resource requests into search requests in sequence by a computer-readable storage medium;

searching a resource list of sensor nodes of a cloud according to search conditions in the search request and obtaining a resource ID of the sensor node that meets the search conditions by the computer-readable storage medium;

searching a data list of the sensor node and reading a working frequency of the sensor node in the resource list by the computer-readable storage medium;

comparing the working frequency with a desired frequency in the search conditions by the computer-readable storage medium to determine if buffered data in the data list can meet requirements;

feeding back the buffered data to the clients by the computer-readable storage medium if the buffered data meets the requirements; and controlling the sensor nodes to collect data according to the search conditions and priorities of the sensor nodes and sending the collected data to the clients by the computer-readable storage medium if the buffered data cannot meet the requirements;

the step of controlling comprises the following sub-steps:

sorting the sensor nodes according to a difference between the working frequency and the highest frequency of each sensor node by the computer-readable storage medium if the buffered data cannot meet the requirements, the highest frequency is the highest working frequency of each sensor node;

waking up the sensor nodes in sequence according to the priorities thereof and sending the search conditions to each waked sensor node by the computer-readable storage medium, the higher the difference is, the higher the priority of the sensor node is, and the sensor node with the bigger difference between the working frequency and the highest frequency of each sensor node is firstly waked up; and controlling the waked sensor node to sample data according to a difference between the desired frequency in the search conditions and the working frequency in the data list by the computer-readable storage medium.

2. The computer-implemented method of claim 1, wherein the method further comprises the following step after the step of searching the resource list:

adding a new sensor node by the computer-readable storage medium if the sensor nodes of the cloud do not meet the search conditions.

3. The computer-implemented method of claim 1, wherein the step of controlling also comprises the following sup-step before the sub-step of waking up:

changing the state of sensor node with the resource ID into busy by the computer-readable storage medium.

4. The computer-implemented method of claim 1, wherein the step of controlling also comprises the following sub-step after the sub-step of controlling:

changing the state of sensor node with the resource ID into sleep by the computer-readable storage medium.

5. The computer-implemented method of claim 1, wherein:

when the working frequency is bigger than the desired frequency, the buffered data in the data list meets requirements; and when the working frequency is smaller than the desired frequency, the buffered data in the data list cannot meet requirements.

6. The computer-implemented method of claim 1, wherein the step of the receiving comprises the following sub-step:

receiving the resource requests in sequence and converting the resource requests into the search requests according to first in first out rule by the computer-readable storage medium.

7. The computer-implemented method of claim 1, wherein the method further comprises the following step before the step of receiving:

editing the resource list of the sensor nodes by the computer-readable storage medium.

8. The computer-implemented method of claim 1, which the method further comprises the following step after the step of receiving:

reusing the data by the computer-readable storage medium if the resource requests are different but the search conditions are substantially identical.

9. A multitasking resource allocation system of IoT, comprising:

a processor; and a computer-readable storage medium storing a program to be executed by the processor, the program including instructions for:

receiving resource requests from clients and converting the resource requests into search requests searching a resource list of sensor nodes of a cloud according to search conditions in the search request and obtaining a resource ID of the sensor node that meets the search conditions;

searching a data list of the sensor node and reading a working frequency of the sensor node in the resource list;

comparing the working frequency with a desired frequency in the search conditions to determine if buffered data in the data list can meet requirements;

feeding back the buffered data to the clients if the buffered data meets the requirements; and controlling the sensor nodes to collect data according to the search conditions and priorities of the sensor nodes and sending the collected data to the clients if the buffered data cannot meet the requirements;

the program further including instructions for:

sorting the sensor nodes according to a difference between the working frequency and the highest frequency of each sensor node if the buffered data cannot meet the requirements, the highest frequency is the highest working frequency of each sensor node;

waking up the sensor nodes in sequence according to the priorities thereof and sending the search conditions to each waked sensor node, the higher the difference is, the higher the priority of the sensor node is, and the sensor node with the bigger difference between the working frequency and the highest frequency of each sensor node is firstly waked up; and controlling the waked sensor node to sample data according to a difference between the desired frequency in the search conditions and the working frequency in the data list.

10. The system of claim 9, wherein the program further including instructions for adding a new sensor node if the sensor nodes of the cloud do not meet the search conditions.

11. The system of claim 9, wherein the program further including instructions for changing the state of sensor node with the resource ID into busy before the sensor node is waked up.

12. The system of claim 9, wherein the program further including instructions for changing the state of sensor node with the resource ID into sleep after the data is sent.

13. The system of claim 9, wherein:

when the working frequency is bigger than the desired frequency, the buffered data in the data list meets requirements; and when the working frequency is smaller than the desired frequency, the buffered data in the data list cannot meet requirements.

14. The system of claim 9, wherein the program further including instructions for receiving the resource requests in sequence and converting the resource requests into the search requests according to first in first out rule.

15. The system of claim 9, wherein the program further including instructions for editing the resource list of the sensor nodes.

16. The system of claim 9, wherein the program further including instructions for reusing the data if the resource requests are different but the search conditions are substantially identical.

* * * * *